United States Patent
Kazuno

(10) Patent No.: US 11,731,528 B2
(45) Date of Patent: Aug. 22, 2023

(54) ELECTRIC VEHICLE AND DISPLAY METHOD

(71) Applicant: HONDA MOTOR CO., LTD., Tokyo (JP)

(72) Inventor: Shuichi Kazuno, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 235 days.

(21) Appl. No.: 17/182,244

(22) Filed: Feb. 23, 2021

(65) Prior Publication Data
US 2021/0276452 A1 Sep. 9, 2021

(30) Foreign Application Priority Data
Mar. 3, 2020 (JP) ................................ 2020-036083

(51) Int. Cl.
*B60L 58/16* (2019.01)
*G06F 3/14* (2006.01)

(52) U.S. Cl.
CPC ........... *B60L 58/16* (2019.02); *B60L 2250/16* (2013.01); *G06F 3/14* (2013.01)

(58) Field of Classification Search
CPC ...... B60L 58/16; B60L 2250/16; B60L 58/10; B60L 58/12; B60L 58/24; G06F 3/14; G06F 3/147; G09G 2380/10; Y02T 10/70; B60K 35/00
USPC .................................................. 340/435, 438
See application file for complete search history.

(56) References Cited

U.S. PATENT DOCUMENTS

| 5,907,238 A * | 5/1999 | Owerko | H02J 9/005 320/136 |
| 10,732,224 B2 * | 8/2020 | Wang | G01R 31/3842 |
| 2001/0008424 A1 * | 7/2001 | Higuchi | G01R 31/3648 348/372 |
| 2005/0017686 A1 * | 1/2005 | Sakakibara | H01M 10/44 320/132 |
| 2005/0174093 A1 * | 8/2005 | Chen | H02J 7/0048 320/132 |
| 2005/0225289 A1 * | 10/2005 | Iida | H02J 7/0069 320/116 |
| 2008/0007221 A1 * | 1/2008 | Lee | G01R 31/3648 320/128 |

(Continued)

FOREIGN PATENT DOCUMENTS

JP 2009208484 A 9/2009

*Primary Examiner* — Omar Casillashernandez
(74) *Attorney, Agent, or Firm* — CKC & Partners Co., LLC

(57) ABSTRACT

To prevent a driver from being given incorrect information regarding the estimation of a degradation state of a secondary battery. An electric vehicle (1) running by driving a motor by electric power of a secondary battery (2), includes a first estimation unit (10A) that estimates a degradation state of the secondary battery (2), a second estimation unit (10B) that estimates the degradation state of the secondary battery (2) by a method different from that of the first estimation unit (10A), a display unit (7) that displays estimation results by the first and second estimation units (10A, 10B), and a display control unit (8) that controls display of the display unit (7). The display control unit (8) switches between and displays the estimation result by the first estimation unit (10A) and the estimation result by the second estimation unit (10B) on the display unit (7).

12 Claims, 1 Drawing Sheet

(56) References Cited

U.S. PATENT DOCUMENTS

| | | | |
|---|---|---|---|
| 2011/0004428 A1* | 1/2011 | Murochi | G01R 31/392 320/132 |
| 2013/0212526 A1* | 8/2013 | Park | G06F 9/451 715/810 |
| 2015/0197161 A1* | 7/2015 | Hua | G07C 5/08 701/34.4 |
| 2016/0121737 A1* | 5/2016 | Henningson | H02J 7/0048 320/109 |
| 2016/0358537 A1* | 12/2016 | Kang | G09G 3/20 |
| 2018/0050601 A1* | 2/2018 | Katanoda | B60L 58/13 |
| 2018/0143035 A1* | 5/2018 | Ricci | G06Q 30/0266 |
| 2020/0384885 A1* | 12/2020 | Namiki | B60L 58/12 |

* cited by examiner

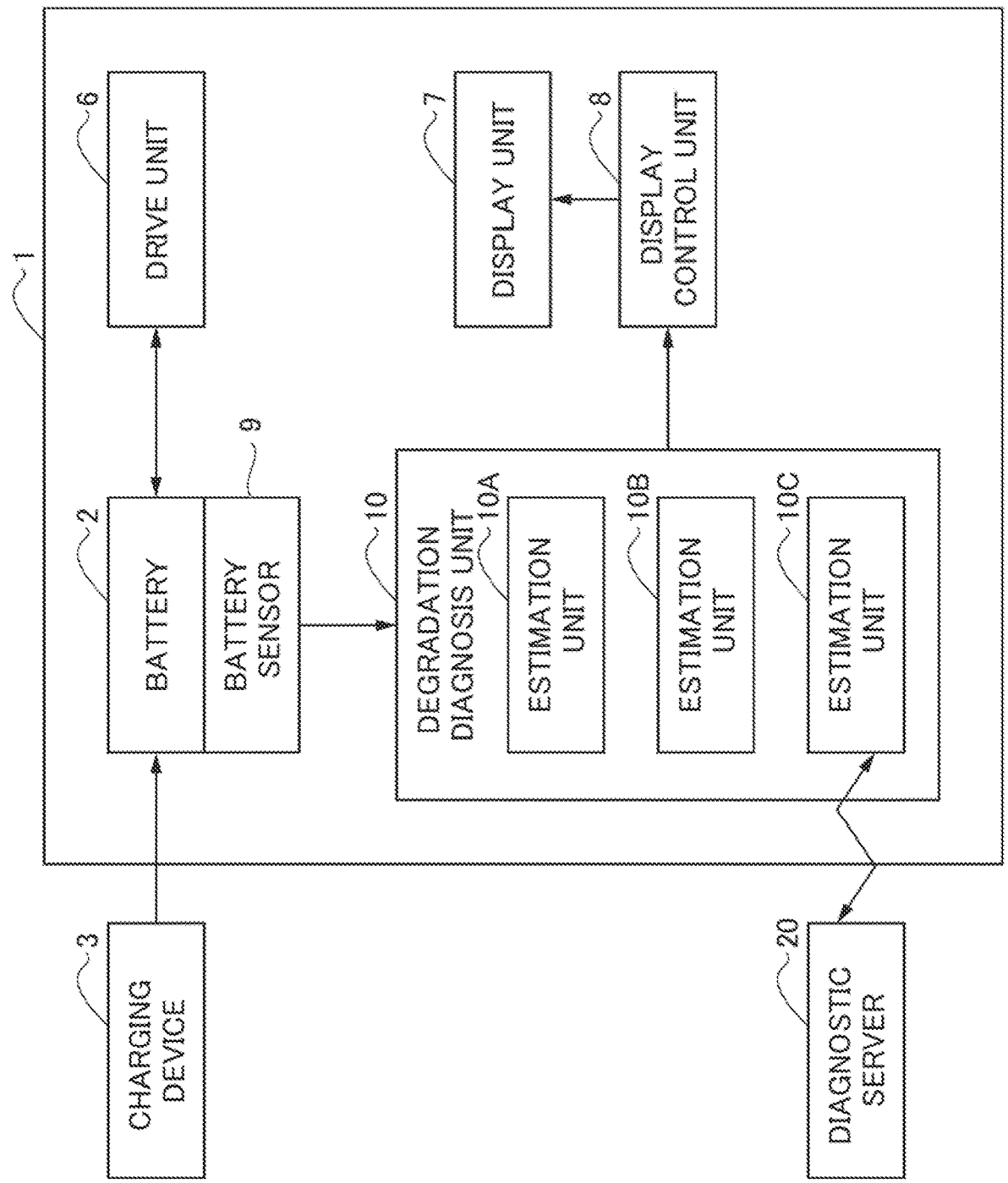

ELECTRIC VEHICLE AND DISPLAY METHOD

This application is based on and claims the benefit of priority from Japanese Patent Application No. 2020-036083, filed on 3 Mar. 2020, the content of which is incorporated herein by reference.

BACKGROUND OF THE INVENTION

Field of the Invention

The present invention relates to an electric vehicle and a display method.

Related Art

Conventionally, electric vehicles running by the driving force of a motor have been provided. The motor is driven by the electric power of a chargeable and dischargeable secondary battery.
In such electric vehicles, it is known to display a value (SOH: state of health) indicating a degradation state of the secondary battery (for example, Patent Document 1).

Patent Document 1: Japanese Unexamined Patent Application, Publication No. 2009-208484

SUMMARY OF THE INVENTION

However, in the conventional art, the estimation accuracy of the degradation state of the secondary battery may be low, and thus there is an issue of giving incorrect information to a driver.

The present invention has been made in consideration of such circumstances, and an object of the present invention is to prevent a driver from being given incorrect information regarding the estimation of a degradation state of a secondary battery.

To achieve the above object, according to a first aspect of the present invention,
an electric vehicle running by driving a motor by electric power of a secondary battery, includes
a first estimation unit that estimates a degradation state of the secondary battery,
a second estimation unit that estimates the degradation state of the secondary battery by a method different from that of the first estimation unit,
a display unit that displays estimation results by the first and second estimation units, and
a display control unit that controls display of the display unit.
The display control unit can switch between and display the estimation result by the first estimation unit and the estimation result by the second estimation unit on the display unit.

In a second aspect of the present invention according to the first aspect,
the display control unit switches and displays on the display unit a display of a number of digits of the estimation result by an operation of a driver.

In a third aspect of the present invention according to the first aspect or the second aspect,
the display control unit switches and displays on the display unit a display of an explanatory text of the estimation result by an operation of a driver.

In a fourth aspect of the present invention according to any one of the first aspect to the third aspect,
the display control unit switches and displays on the display unit a display of accuracy of the estimation result by an operation of a driver.

In a fifth aspect of the present invention according to any one of the second aspect to the fourth aspect,
a selection result by switching the display by the operation of the driver is notified to a server via wireless communication.

According to a sixth aspect of the present invention,
a display method of an electric vehicle running by driving a motor by electric power of a secondary battery, includes
estimating a degradation state of the secondary battery by different methods, and
switching between and displaying estimated values estimated by the different methods.

In a seventh aspect of the present invention according to the sixth aspect,
the switching between and displaying the estimated values estimated by the different methods is executed by an operation of a driver.

According to the present invention, it is possible to prevent the driver from being given incorrect information regarding the estimation of the degradation state of the secondary battery.

BRIEF DESCRIPTION OF THE DRAWINGS

FIG. 1 is a block diagram showing the structure of an electric vehicle according to a first embodiment of the present invention.

DETAILED DESCRIPTION OF THE INVENTION

First Embodiment

[Overall Structure]
FIG. 1 is a diagram showing the structure of an electric vehicle according to a first embodiment of the present invention.
An electric vehicle 1 runs by the electric power of a battery (secondary battery) 2.
The electric vehicle 1 is connected to a charging device 3 with a cable, to charge the battery 2 by the electric power supplied from the charging device 3, and runs by the electric power of the battery 2. During deceleration, the battery 2 is charged by the electric power generated by regenerative braking.
The present invention can be widely applied to charging the battery 2 with the electric power of a built-in internal combustion engine, a fuel cell, or the like in place of or in addition to charging by the charging device 3, charging from a commercial power source using a built-in charging device, and other charging.

The electric vehicle 1 includes a drive unit 6, a display unit 7, a display control unit 8, a battery sensor 9, and other units. The drive unit 6 includes various components such as a motor driven by the electric power of the battery 2, drive wheels rotated by the motor, and a brake mechanism for controlling the rotation of the drive wheels, and during deceleration, supplies to the battery 2 the electric power generated by the regenerative braking of the motor.

The display unit 7 displays vehicle information and the like such as vehicle speed and running distance. For example, an image display panel such as a liquid crystal display panel or an organic EL display panel can be applied.

In addition to the above, a head-up display may also be applied.

Alternatively, a navigation apparatus for displaying navigation information may also be applied.

The display control unit 8 controls the display of the display unit 7, for example, the display control unit 8 acquires various vehicle information, such as vehicle speed output by the controller of the electric vehicle 1, and then displays the information on the display unit 7.

The battery sensor 9 acquires various information necessary for charge/discharge control of the battery 2, and detects at least the terminal voltage, the charge/discharge current, and the temperature of the battery 2.

The electric vehicle 1 controls charge and discharge based on the information detected by the battery sensor 9.

[Degradation Diagnosis]

A degradation diagnosis unit 10 detects degradation of the battery 2. In this embodiment, the degradation diagnosis unit 10 includes a plurality of estimation units 10A, 10B, and 10C, which detect the degradation state of the battery 2 by estimation using different methods.

In the electric vehicle 1, the display control unit 8 switches among and displays on the display unit 7 the detection results by the plurality of estimation units 10A, 10B, and 10C with different methods. This structure allows the driver to check highly accurate detection results as needed, thereby preventing the driver from being given incorrect information regarding the estimation of the degradation state of the secondary battery.

The estimation units 10A, 10B, and 10C estimate the degradation of the battery 2 based on a change in the internal resistance of the battery 2.

The estimation unit 10A calculates the internal resistance from the charge/discharge current and the terminal voltage detected by the battery sensor 9. In accordance with the state of charge (SOC; secondary battery charging rate) based on the terminal voltage of the battery 2 detected in the charge/discharge control, the calculated internal resistance is determined based on the reference value (initial value) to estimate the degradation state.

Although this estimation method is inferior in measurement accuracy because the temperature of the battery 2 is not considered, it is possible to calculate instantaneously during running.

Thus, the estimation method can be said to be suitable for estimating the degradation state during running, and hereinafter referred to as on-board diagnosis during running as appropriate.

When the battery 2 is charged by the charging device 3, the estimation unit 10B calculates the internal resistance from the charge/discharge current and the terminal voltage detected by the battery sensor 9. In accordance with the SOC based on the terminal voltage of the battery 2 detected in the charge/discharge control and the temperature of the battery 2 detected by the battery sensor 9, the calculated internal resistance is determined based on the reference value to estimate the degradation state.

In this estimation method, charge is performed at a certain charging rate (charging current) by the charging device 3, the temperature of the battery 2 is considered, and thus the accuracy is high. However, unfortunately the calculation frequency is low.

Hereinafter, it is referred to as diagnosis during charging.

The estimation unit 10C uploads to a diagnostic server 20 at fixed time intervals the charge/discharge current, the terminal voltage, and the temperature, which are detected by the battery sensor 9, and the SOC based on the terminal voltage of the battery 2 detected in the charge/discharge control, the diagnostic server 20 estimates the degradation state, and the estimation unit 10C acquires the result of the estimation, thereby estimating the degradation state.

The diagnostic server 20 calculates the internal resistance from the charge/discharge current and the terminal voltage, and in accordance with the temperature and the SOC, determines the calculated internal resistance based on the reference value to estimate the degradation state.

In this method, although the degradation state can be estimated with high accuracy by the processing algorithm in the diagnostic server 20 and by increasing the data of the charge/discharge current, the terminal voltage, and the temperature that are uploaded, the calculation cycle is long because the processing is performed by communicating data with the diagnostic server 20, and therefore the instantaneous diagnosis is difficult.

Hereinafter, it is referred to as server diagnosis.

Instead of estimating the degradation state based on changes in the internal resistance, the degradation state may be estimated based on changes in the charge capacity.

In this case, the estimation unit 10A calculates the capacity change ($\Delta AH$) of the battery 2 based on the charge/discharge current and the terminal voltage detected by the battery sensor 9, and estimates the degradation state by dividing the capacity change by the corresponding variation $\Delta SOC$ of the SOC detected in the charge/discharge control. The estimation of the degradation state based on a change in the charge capacity is inferior in measurement accuracy, but the calculation result during running can be calculated instantaneously, similarly to the estimation based on a change in the internal resistance. Thus, this estimation method can be said to be suitable mainly for estimation of the degradation state during running.

When the battery 2 is charged by the charging device 3, the estimation unit 10B estimates the degradation state in the same manner as the estimation unit 10A, in consideration of a temperature detection result.

In the estimation of the degradation state based on a change in the charge capacity, charge is performed at a certain charging rate by the charging device 3 as in the estimation based on a change in the internal resistance, and the variation $\Delta SOC$ of the SOC is large, and thus, the accuracy is high, but unfortunately the calculation frequency is low.

The estimation unit 10C uploads the charge/discharge current and the SOC to the diagnostic server 20 at certain time intervals, the diagnostic server 20 estimates the degradation state, and the estimation unit 10C acquires the result of the diagnosis.

In the estimation of the degradation state based on a change in the charge capacity, the degradation state can be estimated with high accuracy by the processing algorithm in the diagnostic server 20 and by increasing the data that are uploaded. However, the calculation cycle is long because the processing is performed by communicating data with the diagnostic server 20, and therefore the instantaneous diagnosis is difficult.

In this way, the degradation state is detected, and the degradation diagnosis unit 10 calculates the accuracy of the estimated value of the degradation state in each of the estimation units 10A, 10B, and 10C.

Various methods can be applied to the calculation method of the accuracy. For example, when detection is performed by statistical processing of the results of detection such as variation detection, the time segment used for detection of the internal resistance, the capacity change ($\Delta AH$), and the variable $\Delta SOC$ of the SOC can be applied.

The method of calculating the accuracy may be shared by the estimation units 10A, 10B, and 10C, or methods suitable for the detection methods of the estimation units 10A, 10B, and 10C may be applied.

The estimation unit 10C acquires the accuracy calculated by the diagnostic server 20, but the estimation unit 10c may calculate the accuracy.

(Display Control Performed by Display Control Unit)

The display control unit 8 displays the remaining amount (remaining capacity) of the battery 2 detected in the charge/discharge control, and the result of detection of the degradation state performed by the degradation diagnosis unit 10. The display control unit 8 switches the display of the degradation state in response to an operation of the driver, and sequentially and cyclically displays the degradation states estimated by the estimation units 10A, 10B, and 10C. In this display, the estimation results by the estimation units 10A, 10B, and 10C are displayed in an identifiable manner. Specifically, for example, titles such as "on-board diagnosis result during running", "diagnosis result during charging", and "server diagnosis result" are added and displayed.

Alternatively, the display control unit 8 displays the degradation state in this manner, and the display of the number of digits of the estimation result being displayed is switched by an operation of the driver.

More specifically, for example, the degradation state is displayed as a percentage, and the display of the number of decimal places is switched by an operation of the driver. This improves the usability of the electric vehicle 1 for the driver.

Alternatively, the display control unit 8 displays the degradation state in this manner, and the display of the explanatory text of the estimation result being displayed is switched by an operation of the driver.

More specifically, the display control unit 8 starts the display of an explanatory text in response to an operation of the driver, and stops the display in response to an operation of the driver.

Instead of or in addition to this, the explanatory text may be switched between a detailed one and a simple one, or may be switched between a long one and a short one.

This can also improve the usability of the vehicle 1 for the driver.

Alternatively, the display control unit 8 displays the degradation state in this manner, and the display of the accuracy of the estimation result is switched by an operation of the driver.

More specifically, the display control unit 8 switches between display and non-display of the accuracy detected by the estimation units 10A, 10B, and 10C in response to an operation of the driver.

[Information Notification of Display Switching]

The display control unit 8 notifies the diagnostic server 20 of the display of the estimation result by the estimation units 10A, 10B, or 10C, the number of digits of the estimation result, the explanatory text of the estimation result, and the accuracy, which are selected by the driver, together with the current position information at each selection time.

Thus, the diagnostic server 20 stores these notifications, analyzes the stored information, and thereby various uses such as development of a succeeding vehicle can be achieved.

According to the above-described structure, by switching among and displaying a plurality of estimation results obtained by different methods, the driver can check the detection result with high accuracy as necessary, thereby preventing the driver from being given incorrect information regarding the estimation of a degradation state of a secondary battery.

In addition to the above, switching a display of the number of digits of the estimation result, switching a display of the explanatory text of the estimation result, and switching a display of the accuracy of the estimation result, by an operation of the driver, can improve the usability for the driver.

In addition to the above, by notifying the server of the switching of the display by an operation of the driver via wireless communication, these notifications can be stored and used in various ways.

Other Embodiments

While specific structure suitable for carrying out the present invention has been described in detail above, the structure of the above-described embodiment can be modified in various ways without departing from the spirit of the present invention.

That is, although the case where the degradation state is estimated by three estimation units in the above-described embodiment, the present invention is not limited to this. The degradation state may be estimated by two estimation units and the display may be switched. Alternatively, the degradation state may be estimated by four or more estimation units and the display may be switched.

EXPLANATION OF REFERENCE NUMERALS 1 electric vehicle
2 battery
3 charging device
6 drive unit
7 display unit
8 display control unit
9 battery sensor
10 degradation diagnosis unit
10A, 10B, 10C estimation unit
20 diagnostic server

What is claimed is:

1. An electric vehicle running by driving a motor by electric power of a secondary battery, comprising:
a degradation diagnosis unit configured to detect degradation of the secondary battery,
the degradation diagnosis unit comprising:
a plurality of estimation units A, B, and C configured to detect a degradation state of the secondary battery by estimation using different methods;
a display unit configured to display estimation results by the plurality of estimation units A, B, and C; and
a display control unit configured to control display of the display unit,
the display control unit being configured to switch between the estimation results by the plurality of estimation units A, B, and C and display the estimation results on the display unit;
wherein the estimation unit A is configured to calculate an internal resistance from charge/discharge current and a terminal voltage detected by a sensor of the secondary battery, and in accordance with a state of charge (SOC; secondary battery charging rate) based on the terminal voltage of the secondary battery detected in charge/discharge control, determine the calculated internal resistance based on a reference value (initial value) to estimate the degradation state, wherein the estimation unit B is configured to calculate an internal resistance from charge/discharge current and a terminal voltage detected by the sensor of the secondary battery when the secondary battery is charted by a charging device, and in accordance with an SOC based on the terminal voltage of the secondary battery detected in charge/discharge control and a temperature of the secondary battery detected by the sensor of the secondary battery, determine the calculated internal resistance based on a reference value to estimate the degradation state, and wherein the estimation unit C is configured to upload to a diagnostic server at fixed time intervals charge/discharge current, a terminal voltage, and a temperature, which are detected by the sensor of the secondary battery, and an SOC based on the terminal voltage of the secondary battery detected in charge/discharge control, and enable the diagnostic server to estimate the degradation state.

2. The electric vehicle according to claim 1, wherein the display control unit switches and displays on the display unit a display of a number of digits of the estimation result by an operation of a driver.

3. The electric vehicle according to claim 1, wherein the display control unit switches and displays on the display unit a display of an explanatory text of the estimation result by an operation of a driver.

4. The electric vehicle according to claim 1, wherein the display control unit switches and displays on the display unit a display of accuracy of the estimation result by an operation of a driver.

5. The electric vehicle according to claim 2, wherein a selection result by switching the display by the operation of the driver is notified to a server via wireless communication.

6. A display method of an electric vehicle running by driving a motor by electric power of a secondary battery, comprising:
   detecting a degradation state of the secondary battery by estimation using different methods, the detection being performed by a plurality of estimation units A, B, and C; and
   switching between and displaying estimated values estimated by the different methods;
   wherein the estimation unit A is configured to calculate a capacity change ($\Delta AH$) of the secondary battery based on charge/discharge current and a terminal voltage detected by a sensor of the secondary battery and estimate the degradation state by dividing the capacity change by a corresponding variation $\Delta SOC$ of an SOC detected in charge/discharge control,
   wherein the estimation unit B is configured to estimate the degradation state in the same manner as the estimation unit A, in consideration of a temperature result when the secondary battery is charged by a charging device, and
   wherein the estimation unit C is configured to upload charge/discharge current and an SOC to a diagnostic server at certain time intervals and enable the diagnostic server to estimate the degradation state.

7. The display method according to claim 6, wherein the switching between and displaying the estimated values estimated by the different methods is executed by an operation of a driver.

8. An electric vehicle running by driving a motor by electric power of a secondary battery, comprising:
   a degradation diagnosis unit configured to detect degradation of the secondary battery,
   the degradation diagnosis unit comprising:
   a plurality of estimation units A, B, and C configured to detect a degradation state of the secondary battery by estimation using different methods;
   a display unit configured to display estimation results by the plurality of estimation units A, B, and C; and
   a display control unit configured to control display of the display unit,
   the display control unit being configured to switch between the estimation results by the plurality of estimation units A, B, and C and display the estimation results on the display unit;
   wherein the estimation unit A is configured to calculate a capacity change ($\Delta AH$) of the secondary battery based on charge/discharge current and a terminal voltage detected by a sensor of the secondary battery and estimate the degradation state by dividing the capacity change by a corresponding variation $\Delta SOC$ of an SOC detected in charge/discharge control,
   wherein the estimation unit B is configured to estimate the degradation state in the same manner as the estimation unit A, in consideration of a temperature result when the secondary battery is charged by a charging device, and
   wherein the estimation unit C is configured to upload charge/discharge current and an SOC to a diagnostic server at certain time intervals and enable the diagnostic server to estimate the degradation state.

9. The electric vehicle according to claim 8, wherein the display control unit switches and displays on the display unit a display of a number of digits of the estimation result by an operation of a driver.

10. The electric vehicle according to claim 8, wherein the display control unit switches and displays on the display unit a display of an explanatory text of the estimation result by an operation of a driver.

11. The electric vehicle according to claim 8, wherein the display control unit switches and displays on the display unit a display of accuracy of the estimation result by an operation of a driver.

12. The electric vehicle according to claim 9, wherein a selection result by switching the display by the operation of the driver is notified to a server via wireless communication.

* * * * *